Jan. 20, 1959 — N. GLUSS — 2,869,514
AIR CYLINDER
Filed July 26, 1956
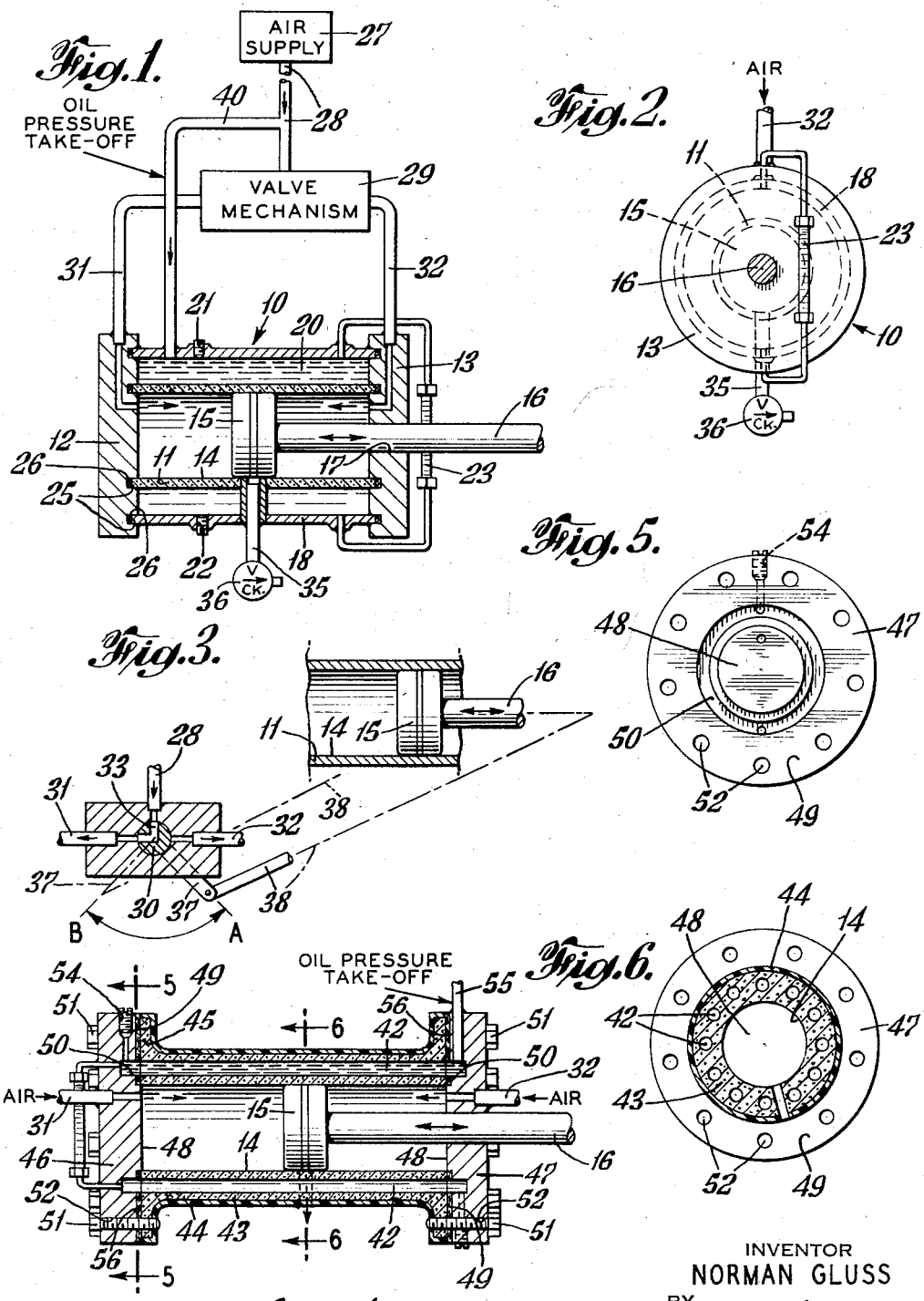
INVENTOR
NORMAN GLUSS
BY Herbert J. Evers
ATTORNEY

United States Patent Office 2,869,514
Patented Jan. 20, 1959

2,869,514

AIR CYLINDER

Norman Gluss, Stamford, Conn.

Application July 26, 1956, Serial No. 600,276

2 Claims. (Cl. 121—1)

This invention relates to the lubrication of cylinder parts, and more particularly concerns a self-lubricating air cylinder for use in engines such as model railroad engines.

In spite of the large amount of development work which has been expended upon lubrication, the problem of lubricating inaccessible engine parts is still a continuing one. Without good lubrication the engine parts wear against each other, and eventually impair the usefulness of the engine.

For example, in a miniature engine employing a precision made air cylinder having a closely fitting piston reciprocating therein, the reduced sizes and inaccessibility of the parts are some of the elements which limit the practicability of the normal methods of lubrication. The fact that the air cylinder may occupy a space less than one cubic inch means that the normal size lubricating groove or opening would provide an excessive amount of lubricant. Restricting the size of the lubrication inlet would require greatly increased pressures for the supply of proper lubrication. Both of these effects necessitate the use of auxiliary equipment, the conventional lubricant opening requiring a larger oil storage capacity, and the restricted size lubricant opening requiring pressure building apparatus, which of course adds to the overall size of the unit. In order that precision made machines of the above type operate with maximum efficiency, it is necessary that the detrimental rubbing action in inaccessible parts be substantially reduced or eliminated.

It is, therefore, an important object of the present invention to provide improved lubricating means in a cylinder and piston construction, which is adapted for embodiment in precision made units such as miniature power plants.

Other objects, features and advantages of the present invention will be apparent from the following detailed description of certain preferred embodiments thereof taken in conjunction with the accompanying drawings, in which:

Fig. 1 is a flow diagram of the air cylinder apparatus illustrating the principles of the present invention;

Fig. 2 is an end view of the air cylinder shown in Fig. 1;

Fig. 3 is an illustrative valve linkage diagram employed in conjunction with the air cylinder apparatus of the invention;

Fig. 4 is a sectional elevational view of a modification of the air cylinder shown in Fig. 1;

Fig. 5 is an end view taken along line 5—5 in Fig. 4; and

Fig. 6 is a sectional view taken along lines 6—6 in Fig. 4.

The invention will be described in connection with an air cylinder, i. e., using compressed air as the means of propulsion. However, it is to be understood that the principles of the invention are susceptible of application in other devices, such as turbines, reciprocating engines— both single acting and double acting, compressors, motors, brakes and engines; and that the apparatus of the invention may utilize other streams of fluid, either gas or liquid, as the motivating medium.

According to the present invention, improved lubrication of inaccessible cylinder parts, particularly miniature cylinder parts, may be effected through the use of a lubricant reservoir which encompasses the cylinder wall, and the provision of a lubricant-permeable cylinder wall which affords means for the transmission of lubricant from the reservoir to the inside wall of the cylinder. A pressure take-off line in the lubricant reservoir operates in accordance with the pressure inside the cylinder to adjustably regulate the flow of lubricant, so that lubricant is neither flooded into the cylinder, nor blown back through the pores of the cylinder parts. An obvious advantage of such an arrangement is that the frequent oiling of cylinder parts may be avoided. In addition, a uniform supply of lubricant is assured over extended periods of time, thus obviating the need for frequent inspections, and contributing to the simplification and ease of operating procedure. When constructed as described below, the cylinder parts are extremely rugged, and have longer wear resistance.

Referring now to Figs. 1 to 4, it will be seen that a motor or air cylinder assembly 10 embodying the principles of the present invention may include a hollow cylinder block or cylinder head 11 normally composed of porous metal, through which a light oil may readily diffuse, and a pair of end flanges or closure plates 12, 13 enclosing the bore 14 of the cylinder head 11 at the ends thereof. Tightly fitting into the bore 14 is a cylindrical piston 15 of substantially conventional construction including piston rings, said piston having secured thereto an elongated piston rod 16 extending through an air-tight opening 17 in the end plate 13.

A non-porous shell 18 concentrically disposed about the cylinder block 11 forms the outer wall of the air cylinder 10, and defines an annular oil chamber or reservoir 20 between the shell and the cylinder block. Lubricating oil may be supplied to the reservoir and replenished through a supply opening 21 in the shell 18, and may be removed through a drain hole 22 in the bottom surface of the shell. The reservoir 20 may be of any desired size, depending upon space requirements, since the reservoir may be in communication with a remote oil supply tank. For example, in miniature engines where space is at a premium, it is desirable that the reservoir space be held to a minimum. A sight gage 23 constitutes means whereby the oil level in the reservoir may be determined.

To maintain the cleanliness of the lubricant contained within the reservoir, and to guard against foreign matter and moisture entering the reservoir, the inner faces of the end plates 12 and 13 are provided with a pair of concentric annular recesses 25 having interfitting therein sealing gaskets 26 in registry respectively with the ends of the cylinder block 11 and shell 18.

The motor 10 of the invention may be either single acting or double acting, the latter being illustrated and described herein. Compressed air from an air supply source 27, which may be remotely positioned with respect to the air cylinder 10, flows through an air line 28 into a valve mechanism 29, for example, a two-way cock valve 30, see Fig. 3, where it is directed into either of cylinder inlet lines 31 or 32. With the valve in the position "A" shown in Fig. 3, the valve passageway 33 connects the air supply line 28 with the cylinder inlet 31, and allows the air to push against the piston face and propel the piston 15 from left to right. As the piston 15 moves past the center of the cylinder 11, it uncovers a suitable uniflow exhaust conduit 35, which discharges the air past a check valve 36 into the atmosphere.

Clock-wise rotation of the valve 30 about its center through approximately a 90° arc to a position "B" joins the air supply line 28 with the cylinder inlet line 32, and allows the air to act on the opposing face of the piston 15 to drive it in the opposite direction.

A feature of the invention lies in the fact that the system is capable of satisfactory operation with a two position cock valve. Positioning of the cock valve 30 may be varied by a valve crank arm 37 and a valve rod arm 38, the crank arm 37 having one end perpendicularly attached to the axis of the cock valve for rotary movement thereabout, and the crank rod 38 having the ends pivotally attached respectively to the ends of the crank arm 37 and piston rod 16.

Since the moving elements of the air cylinder are usually very small and have very little clearance, it is important that they be protected against detrimental metal to metal contact without proper lubrication. According to the invention, self-lubrication of the moving parts of the air cylinder is accomplished through the walls of the cylinder block 11. Communication is established between the lubricant reservoir 20 and the inside wall of the cylinder 11 through suitable apertures in the cylinder wall, or preferably through the pores of the cylinder wall.

A pressure take-off line is provided by a branch conduit 40, which joins the air supply line 28 at one end, and is connected at the other end through an opening in the shell 18 to the reservoir 20. Lubricant under pressure is thereby permitted to flow through the pores of the cylinder block into the low pressure side of the cylinder. Air on the other hand is prevented from flowing into the lubricant reservoir 20 on the high pressure side of the cylinder piston through the pressure equalizing action between said high pressure side and the reservoir brought about by the pressure take-off line 40.

In metals, porosity has made it possible to produce oil impregnated, self-lubricating metals for bearings. I have found that lubrication can be uniformly supplied through the pores of the cylinder wall and other desirable properties of the cylinder enhanced by employing a suitably porous material such as a cylinder wall having an anti-friction facing consisting of porous ferrous material including not more than 1.25% phosphorous and between 0.5% and 1.0% of combined carbon.

A very significant advantage of the invention arises from the fluid seal achieved between the piston and the cylinder wall, in that loss of compression along the sides of the piston is prevented while the efficiency of the engine is improved.

In addition to the foregoing, cylinder parts made in accordance with the present invention do not accumulate significant amounts of deposit on their faces, and evidence no measurable loss in wear life after extended operation of the engine. This is in marked contrast to several commercial air cylinders which have had substantial affinity for dirt and other deposits, and lost a substantial amount of wear during normal operation of the engine.

Various changes and modifications will suggest themselves to those skilled in the art. For example, the cock valve 30 and piston crank arm 37 can be arranged to be completely enclosed in a bath of lubricant or immersed directly in the lubricant reservoir 20, so that the valve parts are protected from dust, chips and moisture.

In the modification shown in Figs. 4, 5 and 6, the annular reservoir 20 may be replaced with a circular series of spaced, open ended, longitudinal lubricant passages acting as reservoirs in the form of cylindrical holes or openings 42 in the cylinder wall coextensive with the length or stroke of the cylinder. The openings 42 may be provided in a porous-bearing metal liner or insert press-fitted into an outer steel cylinder shell, or, as illustrated in Figs. 4 and 6, the longitudinal openings 42 may be provided in a suitably thick porous cylinder wall 43 having an outer oil-impermeable covering or seal 44, such as heavy gage polyethylene, for retaining the oil within the confines of the cylinder. The cylinder wall 43 may be provided at each end with an end flange 45, and the cylinder bore 14 enclosed by a pair of end plates 46 and 47, each having a central face 48 and a coplanar annular margin face 49, and defining an annular recess or groove 50, see Figs. 4 and 5. In assembly the faces of the end plates 46, 47 are retained in abutment with the cylinder ends by spaced bolts 51 passing through registering bolt holes 52 in the end plates and cylinder flanges, so that the recess 50 registers with the cylinder lubricant passages 42.

In order that the lubricant may be supplied to each of the lubricant holes 42 in the cylinder, there is provided an oil inlet 54 in the end plate 46, in communication with the recess 50. In this fashion all the cylinder holes 42 may be lubricated from single inlet 54. An opening 55 in the end plate 47 provides the necessary lubricant pressure, and may be joined to the air supply line 28 in the same manner shown in Fig. 1. Suitable gaskets, such as felted sealing gaskets 56, may be provided in the recesses 50 to prevent leakage of oil.

From the above it will be seen that the present invention provides a self-lubricating cylinder for an air pump, wherein the cylinder is provided with a porous cylinder wall, the cylinder wall being surrounded by an oil chamber having the same chamber pressure as the high pressure side of the cylinder piston.

It will be understood that variations and modifications may be effected without departing from the spirit and scope of the novel concepts of the present invention.

What is claimed is:

1. A reciprocating air engine comprising a cylinder of porous material, a piston reciprocably movable therein, an outer shell surrounding the cylinder, a pair of end plates disposed respectively at opposite ends of said cylinder in abutting and sealing relation with the ends of said cylinder and said shell, thereby defining an enclosed annular lubricant reservoir space between said shell and said cylinder wall, an air supply line gas-tightly connected to said end plates for supplying compressed air to said cylinder, valve means for directing said air supply alternatingly on each side of the piston, and a pressure take-off line in communication with said lubricant reservoir space and connected with said air supply line for equalizing pressure between a portion of said cylinder and said lubricating space.

2. A reciprocating air engine comprising a cylinder of porous material, a piston reciprocably movable therein, an outer shell surrounding the cylinder, a pair of end plates disposed respectively at opposite ends of said cylinder in abutting and sealing relation with the ends of said cylinder and said shell, thereby defining an enclosed annular lubricant reservoir space between said shell and said cylinder wall, an air supply line gas-tightly connected to said end plates for supplying compressed air to said cylinder, valve means for directing said air supply alternatingly on each side of the piston, and a pressure take-off line in communication with said lubricant reservoir space and connected with said air supply line for equalizing pressure between said cylinder and said lubricating space, said valve means being automatically controlled by the reciprocal movement of said piston.

References Cited in the file of this patent

UNITED STATES PATENTS

| | | |
|---|---|---|
| 1,360,497 | Cass | Nov. 30, 1920 |
| 1,634,768 | Bonner | July 5, 1927 |
| 1,910,019 | Kelly | May 23, 1933 |
| 2,610,096 | Mallory | Sept. 9, 1952 |
| 2,696,410 | Topanelian | Dec. 7, 1954 |